US008472070B2

(12) United States Patent
Murayama

(10) Patent No.: US 8,472,070 B2
(45) Date of Patent: Jun. 25, 2013

(54) IMAGE FORMING APPARATUS

(75) Inventor: Kentaro Murayama, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 430 days.

(21) Appl. No.: 12/729,397

(22) Filed: Mar. 23, 2010

(65) Prior Publication Data

US 2011/0026044 A1 Feb. 3, 2011

(30) Foreign Application Priority Data

Jul. 31, 2009 (JP) ................................ 2009-178976

(51) Int. Cl.
*G06F 15/00* (2006.01)

(52) U.S. Cl.
USPC .......................................................... 358/1.5

(58) Field of Classification Search
USPC ................................................. 358/1.5, 1.12
See application file for complete search history.

(56) References Cited

U.S. PATENT DOCUMENTS

| | | | | |
|---|---|---|---|---|
| 8,045,218 | B2 * | 10/2011 | Qiao et al. | 358/1.5 |
| 2008/0225307 | A1 | 9/2008 | Murayama et al. | |
| 2009/0086236 | A1 | 4/2009 | Ohmiya | |

FOREIGN PATENT DOCUMENTS

| | | | |
|---|---|---|---|
| JP | 2002-174992 | | 6/2002 |
| JP | 2004-109682 | | 4/2004 |
| JP | 2006-284773 | A | 10/2006 |
| JP | 2007-078778 | A | 3/2007 |
| JP | 2008-225192 | | 9/2008 |
| JP | 2008-233410 | | 10/2008 |
| JP | 2009-086444 | A | 4/2009 |
| JP | 2009-122138 | A | 6/2009 |

OTHER PUBLICATIONS

JP Office Action dtd Apr. 19, 2011, JP Appln. 2009-178976, English translation.

* cited by examiner

*Primary Examiner* — Saeid Ebrahimi Dehkordy
(74) *Attorney, Agent, or Firm* — Banner & Witcoff, Ltd.

(57) ABSTRACT

An image forming apparatus includes a first determination section which determines at least one of a position and a density of a mark; a correction section which corrects at least one of an image forming position and an image formation density of a formation section; a second determination section which determines whether a related element which affects the determination result by the first determination section satisfies a set condition; and a control section which controls the formation section to form a mark based on a mark element including at least one of: a width in the moving direction of the object; a width in a direction perpendicular to the moving direction; a density; a distance with an adjacent mark in a pattern; and a number of marks in the pattern, which is increased when the second determination section determine that the related element satisfies the set condition.

10 Claims, 10 Drawing Sheets

IMAGE FORMING APPARATUS

CROSS-REFERENCE TO RELATED APPLICATION

This application claims priority from Japanese Patent Application No. 2009-178976, filed on Jul. 31, 2009, the entire subject matter of which is incorporated herein by reference.

TECHNICAL FIELD

Aspects of the present invention relate to an image forming apparatus.

BACKGROUND

An image forming apparatus includes a plurality of formation units which are aligned along a sheet transport belt, and sequentially forms each color image on a sheet transported on the belt by each formation unit. In such an image forming apparatus, a technique called registration is employed to reduce or prevent deviation (positional deviation) of an image forming position of each color on the sheet between the formation units, or a technique called density correction to reduce or prevent density change of a toner image of each formation unit.

The image forming apparatus which employs these technique includes an optical sensor having a light emitting section and a light receiving section. The light emitting section emits light to the belt, and the light receiving section receives the reflected light and outputs a light receiving signal corresponding to the amount of received light. Moreover, when performing the registration or density correction, a mark is formed on the belt by each formation unit. Then, the position or the density of the mark is determined by reading the variation of reflectance (amount of reflected light) between the belt surface and the mark surface based on the light receiving signal from the light receiving section, and deviation of the image forming position or density is corrected based on the determination result.

However, the determination precision of the position or density of the mark may vary according to the use condition and the like of the image forming apparatus. Nevertheless, since the same mark is always used in the technique described above, there is a possibility that the efficiency in time for determining the mark position or the efficiency in the amount of toner used or the like might deteriorate.

SUMMARY

Accordingly, it is an aspect of the present invention to provide an image forming apparatus capable of efficiently determining the position or density of a mark.

According to an illustrative embodiment of the present invention, there is provided an image forming apparatus comprising: a formation section configured to form an image on an object which moves relatively thereto in a moving direction; a detection section configured to output a detection signal corresponding to a mark formed on the object by the formation section; a first determination section configured to determine at least one of a position of the mark and a density of the mark based on the detection signal; a correction section configured to correct at least one of an image forming position and an image formation density of the formation section based on a determination result by the first determination section; a second determination section configured to determine, before the determination by the first determination section, whether a related element which affects the determination result by the first determination section satisfies a set condition which causes an adverse effect on the determination by the first determination section; and a control section configured to control the formation section to form a pattern including a mark based on a mark element which is increased when the second determination section determine that the related element satisfies the set condition, compared with that when the second determination section determines that the related element does not satisfy the set condition, the mark element of the mark including at least one of: a width thereof in the moving direction of the object; a width thereof in a direction perpendicular to the moving direction; a density thereof; a distance with an adjacent mark in the pattern; and a number of marks in the pattern.

According to this configuration, it is possible to efficiently determine the position or density of a mark.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Illustrative embodiments of the present invention will be described with reference to the accompanying drawings.

(Overall Configuration of a Printer)

Figure 1:
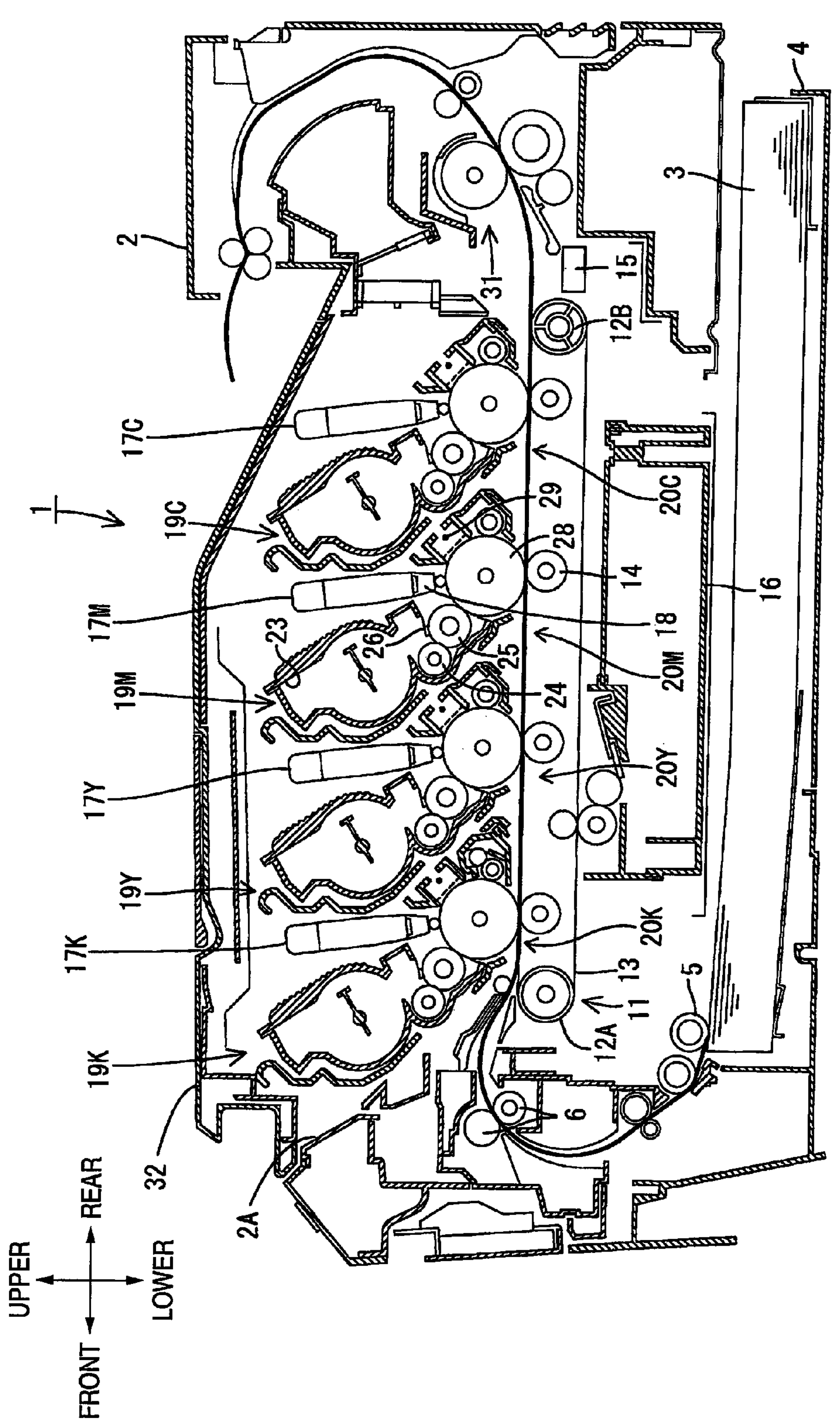
FIG. 1 is a side sectional view showing the schematic configuration of a printer according to an illustrative embodiment of the present invention.

As shown in FIG. 1, a printer 1 (as an example of an image forming apparatus) is a direct transfer type color printer which forms a color image using toner of four colors (black K, yellow Y, magenta M, and cyan C).

As shown by arrows in FIG. 1, the left side of the drawing is a front side of the printer 1 and the right side of the drawing is a rear side of the printer 1. A direction perpendicular to the sheet of FIG. 1 is a left-right direction of the printer 1. In the following description, K (black), C (cyan), M (magenta), and Y (yellow) which mean respective colors are attached to the ends of reference numerals of constituent components when distinguishing the components or terms of the printer 1 for each color.

The printer 1 includes a casing 2. The printer 1 further includes, in a bottom portion of the casing 2, a tray 4 in which a plurality of sheets 3 (specifically, a sheet or an OHP sheet as an example of an object) can be loaded. Above the front upper end of the tray 4, a pickup roller 5 is provided. The pickup roller 5 is rotatably driven and feeds the uppermost sheet 3 of the sheets 3 loaded in the tray 4, to a registration roller 6. The registration roller 6 transports the sheet 3 onto a belt unit 11 after performing skew correction of the sheet 3.

The belt unit 11 includes a pair of support rollers 12A and 13B, and the endless belt 13 (an example of an object) which is looped around the pair of support rollers 12A and 12B. The belt 13 is formed of a resin material, such as polycarbonate, and the surface of the belt 13 is mirror-finished. The belt 13 rotates clockwise in the drawing by rotation of the support roller 12B provided on the rear side and transports the sheet 3 on the upper surface. Four transfer rollers 14 are provided at the inner side of the belt 13. Each transfer roller 14 opposes a photosensitive drum 28 of corresponding process section 19K, 19Y, 19M and 19C (described later) with the belt 13 interposed therebetween.

A mark sensor 15 (an example of a detection section) for determining the position of a mark M, which is formed on the surface of the belt 13 when performing correction processing (described later), is provided at the rear end side of the belt 13. A cleaning device 16 which collects toner, sheet particles, and the like adhering to the surface of the belt 13 is provided below the belt unit 11.

Four exposure sections 17K, 17Y, 17M, and 17C and the four process sections 19K, 19Y, 19M, and 19C are provided above the belt unit 11 so as to be aligned in the front-rear direction. One formation unit 20 includes one of the exposure sections 17K, 17Y, 17M and 17C, one of the process sections 19K, 19Y, 19M and 19C, and one of the above-described transfer rollers 14. In the entire printer 1, four formation units 20K, 20Y, 20M, and 20C (as an example of formation section) respectively corresponding to the colors black, yellow, magenta, and cyan are provided.

Each of the exposure sections 17K, 17Y, 17M and 17C has an LED head 18 including a plurality of LEDs arranged in a line. Emission control of each of the exposure sections 17K, 17Y, 17M and 17C is performed based on the image data to be formed, and each of the exposure sections 17K, 17Y, 17M and 17C performs exposure by emitting light from the LED head 18 to the surface of the opposing photosensitive drum 28 on line-by-line basis.

Hereinafter, the alignment direction of the four process sections 19K, 19Y, 19M, and 19C (four photosensitive drums 28) is referred to as a "sub-scanning direction" (an example of a moving direction of an object). Further, a direction perpendicular to the sub-scanning direction is referred to as a "main scanning direction" (an example of a direction perpendicular to the moving direction). In this illustrative embodiment, the main scanning direction matches the arrangement direction of the plurality of LEDs.

Each of the process sections 19K, 19Y, 19M and 19C has a toner accommodating chamber 23 for accommodating toner of corresponding color and includes a supply roller 24, a developing roller 25, a layer thickness regulating blade 26, and the like below the toner accommodating chamber 23. Toner discharged from the toner accommodating chamber 23 is supplied to the developing roller 25 by rotation of the supply roller 24 and is positively charged by friction between the supply roller 24 and the developing roller 25.

The toner supplied onto the developing roller 25 is conveyed between the layer thickness regulating blade 26 and the developing roller 25 with the rotation of the developing roller 25. The toner is sufficiently charged by friction between the layer thickness regulating blade 26 and the developing roller 25 and is then held on the developing roller 25 as a thin layer with an uniform thickness.

In each of the process sections 19K, 19Y, 19M and 19C, the photosensitive drum 28 having a surface covered by a positively chargeable photosensitive layer, and a scorotron-type charger 29 are provided. When forming an image, the photosensitive drum 28 is driven to rotate, and the surface of the photosensitive drum 28 is uniformly charged positively by the charger 29. The positively charged portion is exposed by each of the exposure sections 17K, 17Y, 17M and 17C. Accordingly, an electrostatic latent image is formed on the surface of the photosensitive drum 28.

Subsequently, the toner on the developing roller 25 is supplied to the electrostatic latent image, so that the electrostatic latent image is formed as a toner image which is a visible image. Then, the toner image formed on the surface of each photosensitive drum 28 is sequentially transferred onto the sheet 3 by a negative transfer voltage applied to the transfer roller 14 while the sheet 3 is passing through each transfer position between the photosensitive drum 28 and the transfer roller 14. Then, the sheet 3 on which the toner image has been transferred is transported to a fixing device 31, and the toner image is fixed by heat. Then, the sheet 3 is transported upward to be discharged to the upper surface of the casing 2.

The upper surface of the casing 2 is formed with an opening portion 2A. A cover 32 is provided to be rotatable about a rear end of the casing 2 and covers the opening portion 2A.

(Electrical Configuration of a Printer)

Figure 2:
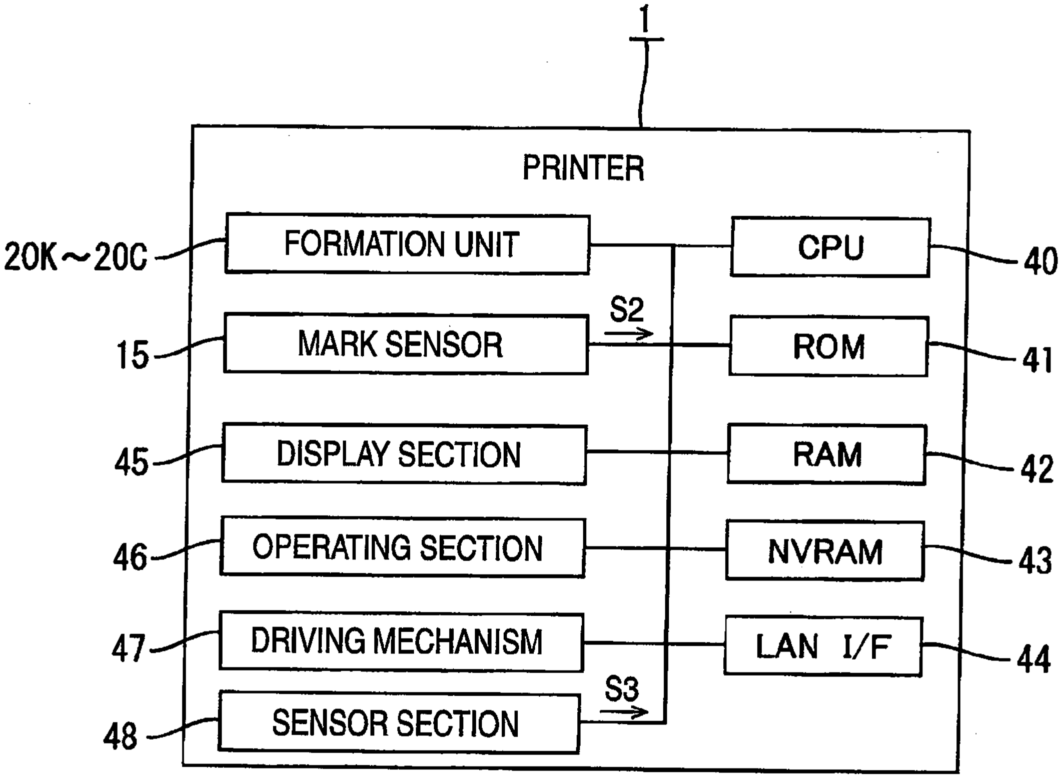
FIG. 2 is a block diagram schematically showing the electrical configuration of the printer.

As shown in FIG. 2, the printer 1 includes a Central Processing Unit (CPU) 40 (as an example of a first determination section, a correction section, a second determination section, and a control section), a Read Only Memory (ROM) 41, a Random Access Memory (RAM) 42, a nonvolatile RAM (NVRAM) 43, and a network interface 44. The above-described formation units 20K, 20Y, 20M and 20C and the mark sensor 15, a display section 45, an operating section 46, a driving mechanism 47, and a sensor section 48 are connected to these.

A program for performing various operations of the printer 1, such as mode-related processing or correction processing (described later) is stored in the ROM 41. The CPU 40 controls each section according to the program read from the ROM 41 while storing the processing result in the RAM 42 or the NVRAM 43. The network interface 44 is connected to an external computer (not shown) through a communication line, so that data communication can be performed between the network interface and the extermal computer.

The display section 45 has a liquid crystal display, a lamp, and the like. The display section 45 can display various kinds of setting screens, operating states of the apparatus, and the like. The operating section 46 has a plurality of buttons. Using the operating section 46, the user can perform various kinds of input operations. The driving mechanism 47 has a driving motor and the like and drives the belt 13 to rotate.

The sensor section 48 includes a cover sensor, a temperature sensor, and a rotation sensor, for example (not shown in FIG. 1). The cover sensor outputs a detection signal according to opening and closing of the cover 32. The temperature sensor is provided in the casing 2 and outputs a detection signal according to the temperature in the casing 2. The rotation sensor has an encoder, for example, and outputs a detection signal according to the rotation position or rotation speed of the support roller 12B. The CPU 40 specifies the number of times of opening and closing of the cover 32, a temperature change in the casing 2, the number of rotations of the support roller 12B (or the belt 13), and the rotation acceleration of the support roller 12B (or the belt 13) based on a detection signal S3 from the sensor section 48.

(Configuration of a Mark Sensor)

Figure 3:
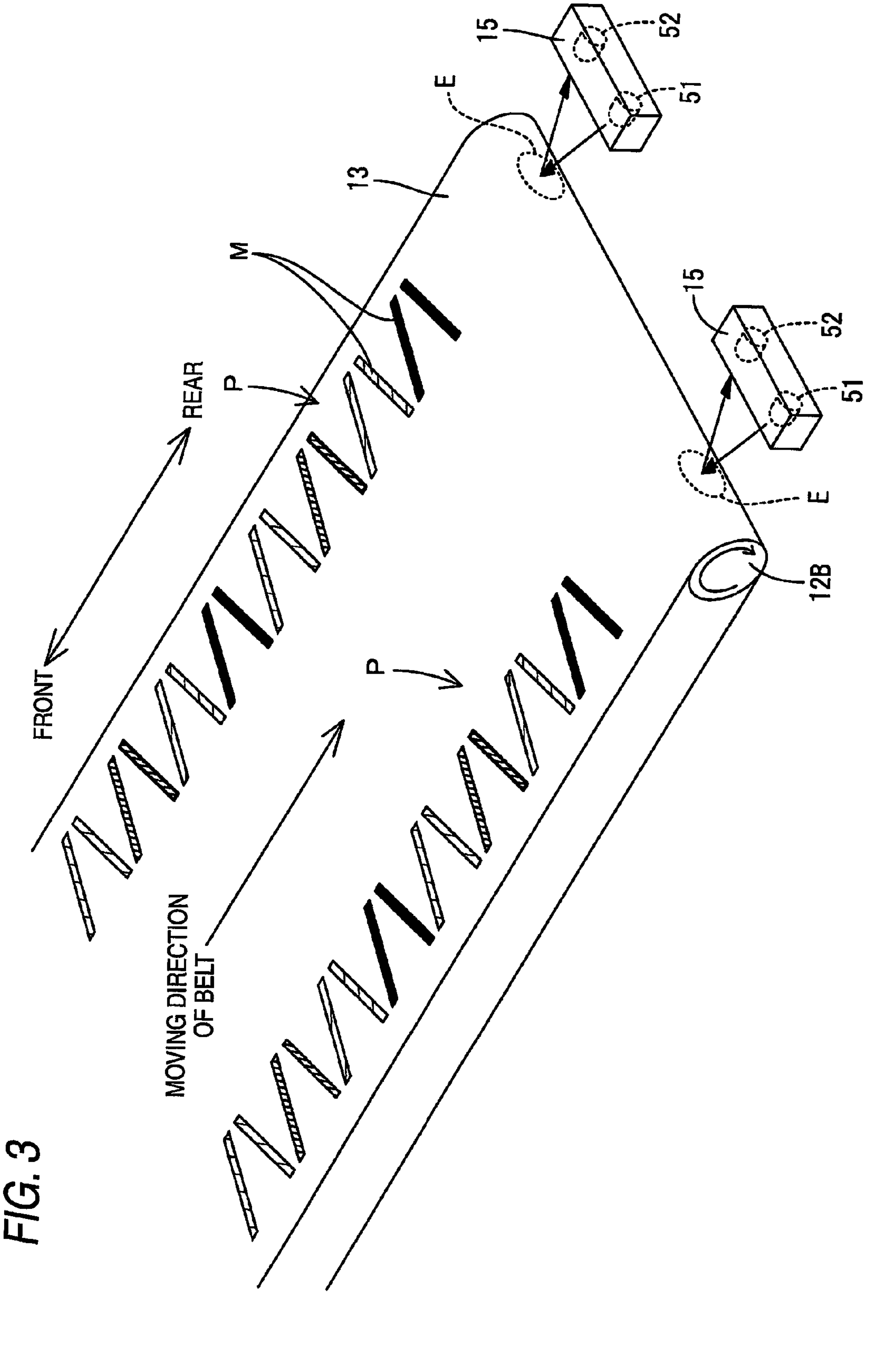
FIG. 3 is a perspective view showing a mark sensor and a belt.

As shown in FIG. 3, one or plural mark sensors 15 (for example, two mark sensors 15 in this illustrative embodiment) are provided in lower portions at the rear side of the belt 13, and the two mark sensor 15 are arranged in the left-right direction. Each mark sensor 15 is a reflective optical sensor which includes a light emitting element 51 (for example, an LED) and a light receiving element 52 (for example, a phototransistor). Specifically, the light emitting element 51 emits light onto the surface of the belt 13 from the oblique direction, and the light receiving element 52 receives the reflected light from the surface of the belt 13. The spot area formed on the belt 13 by the light from the light emitting element 51 is a detection region E of the mark sensor 15. In the moving direction of the belt 13, the thickness of each mark M is narrower than the width of the detection region E.

Figure 4:
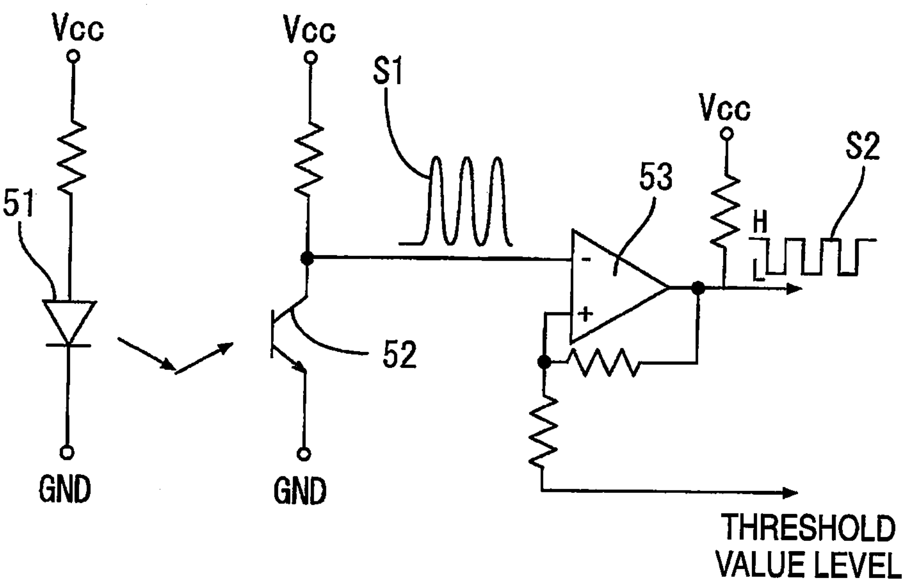
FIG. 4 is a view showing the circuit configuration of a mark sensor.

FIG. 4 is a circuit diagram of the mark sensor 15. A light receiving signal S1 from the light receiving element 51 becomes a lower level as the amount of received light in the light receiving element 52 is higher, and becomes a higher level as the amount of received light is lower. The light receiving signal S1 is input to a hysteresis comparator 53. The hysteresis comparator 53 compares the level of the light receiving signal S1 with a threshold value (first threshold value TH1, second threshold value TH2) and outputs a binary signal S2 (an example of a detection signal) whose level is inverted according to the comparison result.

The CPU 40 is capable of adjusting the amount of emitting light from the light emitting element 51 by changing the PWM value (duty ratio) of a PWM signal which is applied to a driving circuit (not shown) for driving the light emitting element 51. In this illustrative embodiment, as the PWM value increases, the amount of emitting light increases. Before mark determination, the CPU 40 emits light from the light emitting element 51 onto the base of the belt 13, acquires the light receiving signal S1 from the mark sensor 15, adjusts the amount of the emitting light so that the level of the light receiving signal S1 becomes a predetermined level, and stores the PWM value after the adjustment as a PWM value for light emission adjustment in the NVRAM 43, for example. The CPU 40 may acquire the binary signal S2 and adjust the amount of emitting light such that the rate of the high level and the low level falls within a predetermined range (for example, 4:6 to 6:4).

(Configuration of a Correction Pattern)

Figure 5:
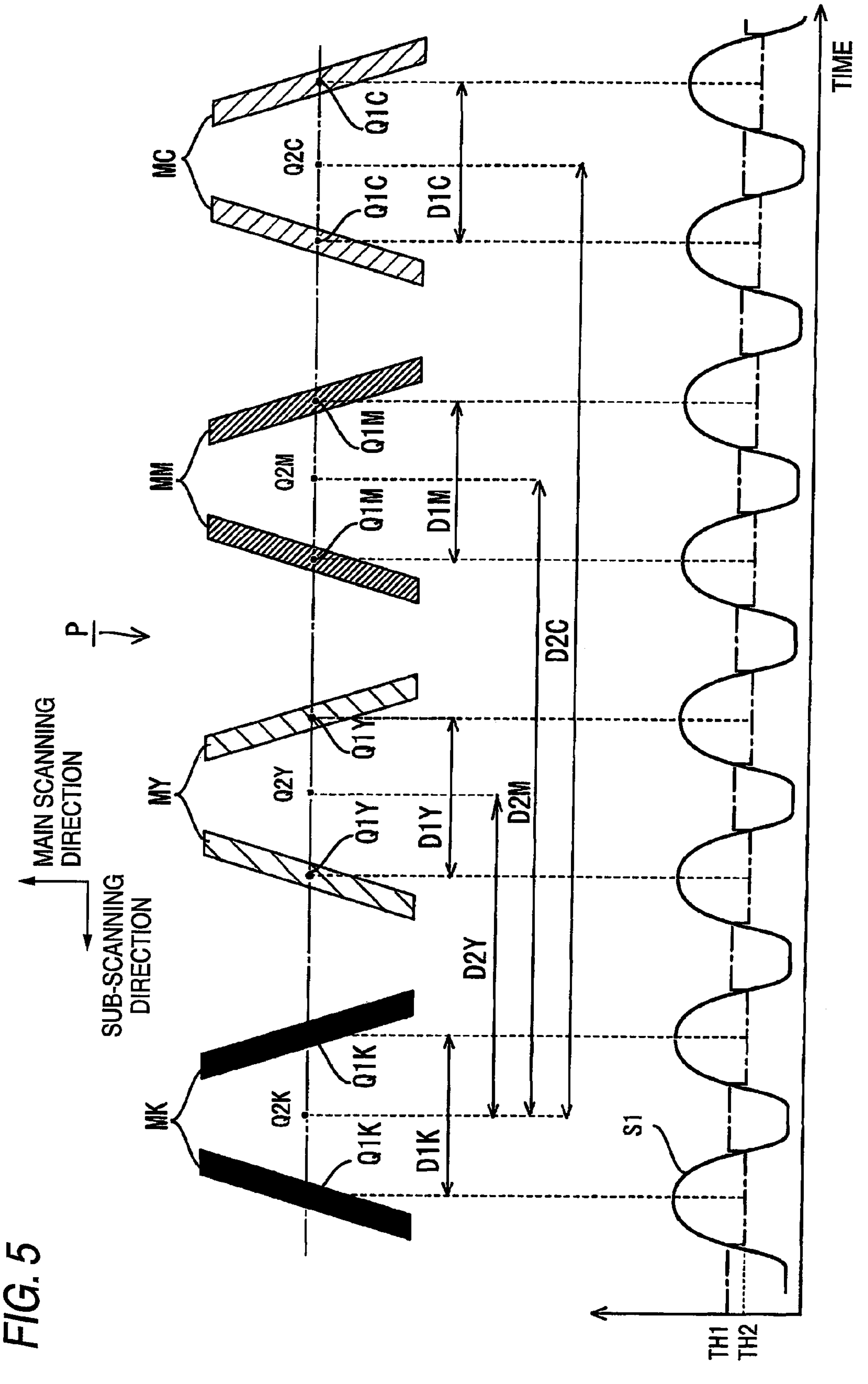
FIG. 5 is a view showing the relationship between a correction pattern and a waveform of a light receiving signal.

In FIG. 5, the configuration of a correction pattern P is shown in the upper portion, and the waveform of the light receiving signal S1 when the mark M of each color, which configures the correction pattern P, passes the detection region E is shown in the lower portion. The left and right direction in FIG. 5 corresponds to the sub-scanning direction.

The correction pattern P is used to measure the amount of positional deviation between color images formed by the respective formation units 20 in the main scanning direction and the sub-scanning direction. In this illustrative embodiment, black is set as a reference color, and yellow, magenta, and cyan are set as adjustment colors. The positional deviation is corrected by adjusting the image forming position of each adjustment color based on the image forming position of the reference color.

The correction pattern P includes one or plural mark groups (in FIG. 5, only one mark group is shown) having a black mark MK, a yellow mark MY, a magenta mark MM, and a cyan mark MC aligned in this order along the substantially sub-scanning direction. Each mark M has a pair of strip-shaped marks, and each of the pair of stripe-shaped marks is inclined by a predetermined angle from a straight line extending in the main scanning direction. The pair of stripe-shaped marks are symmetrical with respect to the straight line.

In this illustrative embodiment, since the belt 13 is mirror-finished as described above, the reflectance of the belt 13 is higher than that of the toner corresponding to any of the four colors. Therefore, as shown in the lower portion of FIG. 5, when light from the light emitting element 51 is emitted onto the base of the belt 13 (surface of the belt 13 on which the mark M is not formed), the level of the light receiving signal S1 becomes lowest. On the other hand, when the light from the light emitting element 51 is emitted onto the mark M formed on the belt 13, the level of the received light amount in the light receiving element 52 becomes low, so that the level of the light receiving signal S1 becomes high.

The CPU 40 calculates the intermediate position Q (intermediate timing) between the falling edge and the rising edge of the binary signal S2, for example. This intermediate position is set as a position Q1 of each stripe-shaped mark of each mark M, and the intermediate position of the positions Q1 of the stripe-shaped marks for each mark M is set as a position Q2 in the sub-scanning direction of each mark M.

Hereinafter, a positional distance (Q1K-Q1K, Q1Y-Q1Y, Q1M-Q1M, Q1C-Q1C) between the stripe-shaped marks in each mark M is referred to as a mark width D1. The mark width D1 varies according to the position in the main scanning direction of each mark M. Therefore, when the position of the mark M formed on the belt 13 deviates in the main scanning direction, the mark width D1 detected based on the binary signal S2 from the mark sensor 15 also varies. Accordingly, the position of the mark M in the main scanning direction can be specified by the mark width D1. In addition, a position distance (Q2K-Q2Y, Q2K-Q2M, Q2K-Q2C) between each of the adjustment color marks MY, MM, and MC and the reference color mark MK in the sub-scanning direction is referred to as an inter-mark distance D2. The inter-mark distance D2 varies according to the amount of positional deviation of an adjustment color image with respect to the reference color image in the sub-scanning direction.

(Processing for Correction of a Deviation Amount)

(1) Mode-Related Processing

A user can select and set one of a "high-precision mode", a "normal mode", and a "speed mode (or a toner save mode)", for example, by an operation using the operating section 46. The user may select the "high-precision mode" for setting the target level (determination precision required for mark determination) of the mark determination precision to a first level which is the highest level when the user wants to perform high-precision mark determination. The user may select the "speed mode" for setting the target level to a third level which is the lowest level when the user wants to perform the mark determination at the high speed. Otherwise, the user may select the "normal mode" for setting the target level to a second level between the first and third levels.

The CPU 40 performs a mode-related processing when a predetermined condition, such as replacement of the formation unit 20 or the belt unit 11, opening and closing of the cover 32, elapse of a predetermined time from the execution of a previous correction processing, or a condition where the number of sheets 3 on which images have been formed reaches a predetermined number of sheets, is satisfied. In this mode-related processing, the number of marks M included in each correction pattern P is determined based on a difference (an example of a related element) of the target level from the last mark determination.

Figure 6:
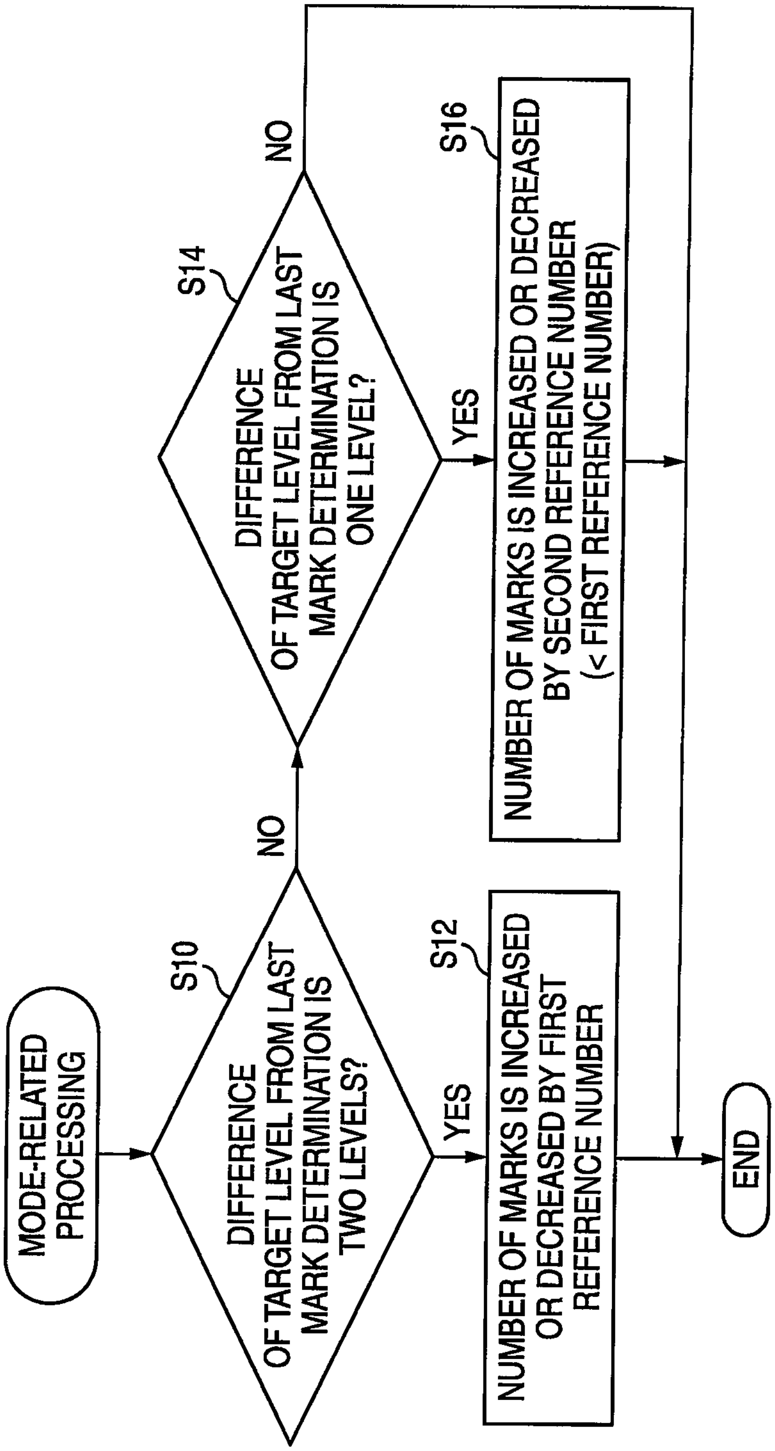
FIG. 6 is a flow chart showing a mode-related processing.

Specifically, as shown in FIG. 6, when the difference of the target level from the last mark determination is two levels (S10: YES), the CPU 40 increases or decreases the number of marks M by a first reference number from that at the time of the last mark determination (S12). More specifically, when the target level has increased by two levels from the last mark determination, the CPU 40 increases the number of marks M by the first reference number from that at the time of the last mark determination. For example, this occurs when the speed mode is set in the last mark determination and the high-precision mode is set currently. In this case, although the time required for the mark determination becomes longer since the total length of the correction pattern P increases as the number of marks M increases, the mark determination precision can be improved.

On the contrary, when the target level has decreased by two levels from the last mark determination, the CPU 40 decreases the number of marks M by the first reference number from that at the time of the last mark determination. For example, this occurs when the high-precision mode is set in the last mark determination and the speed mode is set currently. In this case, although the mark determination precision is reduced as the number of marks M decreases, the time required for the mark determination can be reduced since the total length of the correction pattern P decreases.

Then, when the difference of the target level from the last mark determination is one level (S10: NO and S14: YES), the CPU 40 increases or decreases the number of marks M by a second reference number, which is smaller than the first reference number, from that at the time of the last mark determination (S16). More specifically, when the target level has increased by one level from the last mark determination, the CPU 40 increases the number of marks M by the second reference number from that at the time of the last mark determination. For example, this occurs when the speed mode is set in the last mark determination and the normal mode is set currently or when the normal mode is set in the last mark determination and the high-precision mode is set currently. In this case, although the time required for the mark determination becomes longer since the total length of the correction pattern P increases as the number of marks M increases, the mark determination precision can be improved.

On the contrary, when the target level has decreased by one level from the last mark determination, the CPU 40 decreases the number of marks M by the second reference number from that at the time of the last mark determination. For example, this occurs when the normal mode is set in the last mark determination and the speed mode is set currently or when the high-precision mode is set in the last mark determination and the normal mode is set currently. In this case, although the mark determination precision is deteriorated as the number of marks M decreases, the time required for the mark determination can be reduced since the total length of the correction pattern P decreases.

When there is no difference of the target level from the last mark determination (S14: NO), the number of marks M is not changed. Then, the mode-related processing ends, and the process proceeds to a correction processing. As described above, when it is determined that the mark determination precision is deteriorated from the target level due to the difference of the target level from the last mark determination (an example of the case where a set condition is satisfied), the number of marks M is increased. Therefore, since the number of marks M can be appropriately increased or decreased according to the target level, useless consumption of toner caused by forming the unnecessary mark M can be suppressed.

(2) Correction Processing

Figure 7:
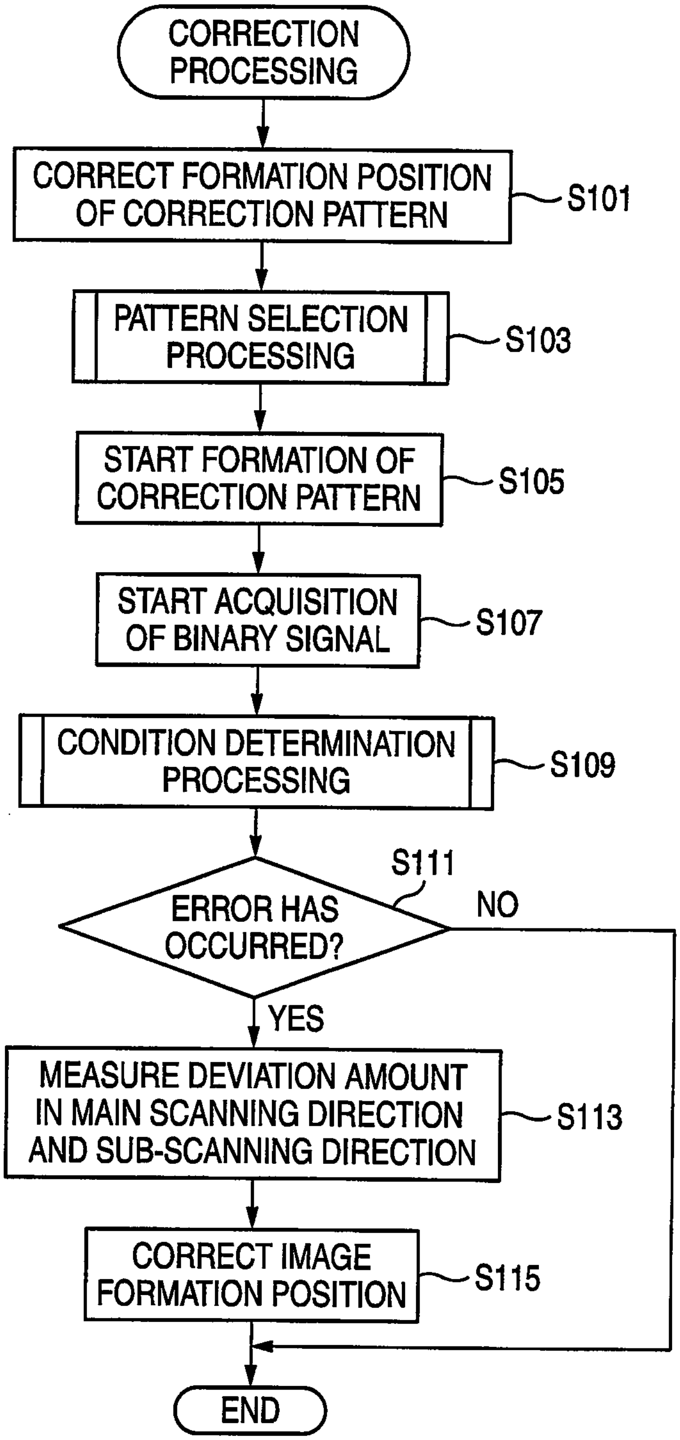
FIG. 7 is a flow chart showing a correction processing.

As shown in FIG. 7, in the correction processing, the CPU 40 corrects the formation position of the correction pattern P in the main scanning direction at the time of mark determination (S101). Specifically, the CPU 40 reads from the NVRAM 43 the position (mark width D1K of the black mark MK) of the reference color mark MK in the main scanning direction at the time of last mark determination, sets the pattern position correction value for correcting the formation position of the correction pattern P such that the relative positional deviation amount between the position of the reference color mark MK and the position (an example of the detection position of a detection section) of the detection region E in the main scanning direction, and stores it in the NVRAM 43, for example. Accordingly, it is possible to suppress that the marks M of the correction pattern P is formed at the position deviated from the detection region E which causes the mark determination precision to deteriorate.

(2-1) Pattern Selection Processing

Figure 8:
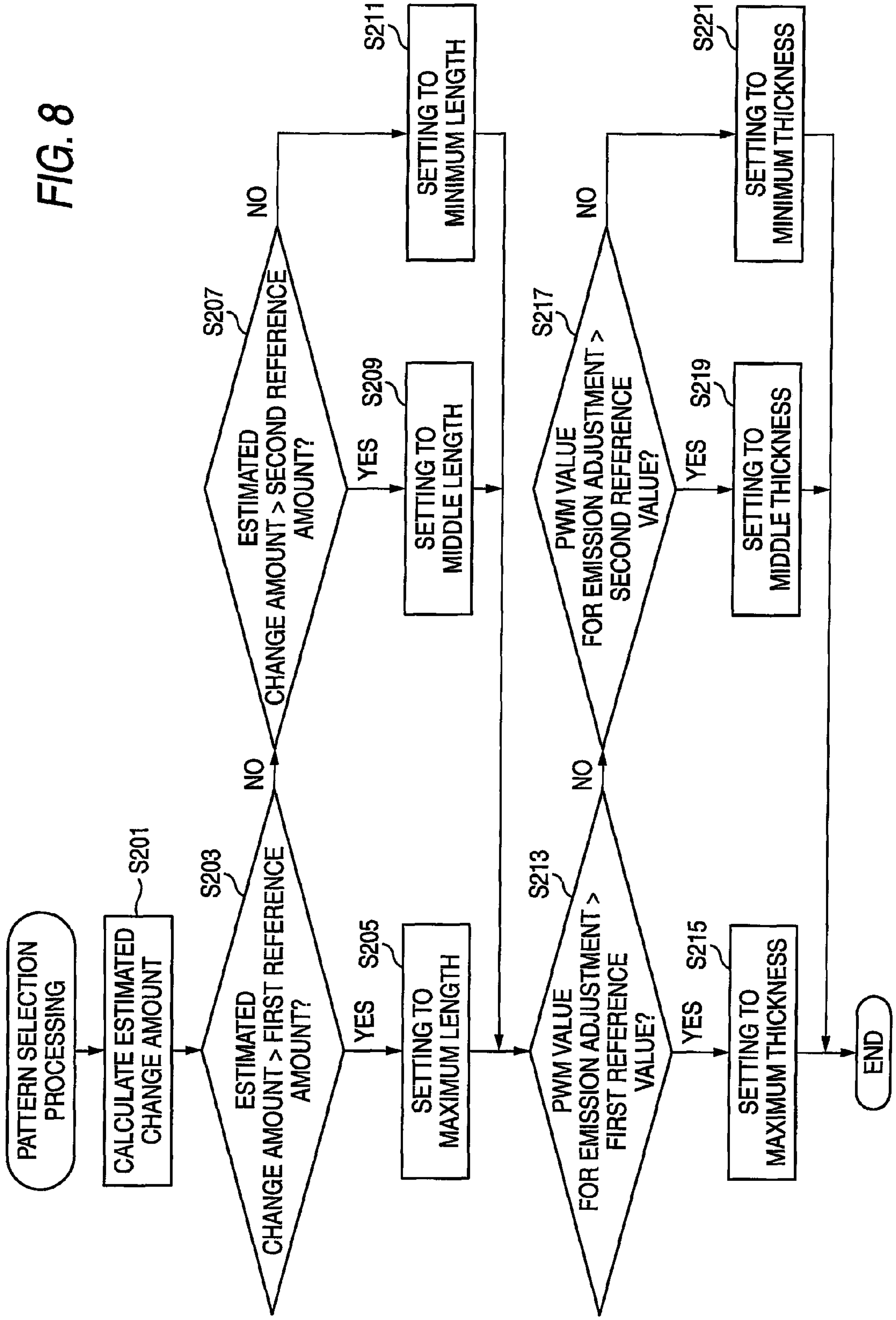
FIG. 8 is a flow chart showing a pattern selection processing.

Then, the CPU 40 performs a pattern selection processing shown in FIG. 8 (S103). In the pattern selection processing, the length or thickness of the mark M of the correction pattern P is determined. Specifically, the deviation amount estimated from the last mark determination (an example of a related element), which is referred to as an estimated change amount, is calculated (S201). The estimated change amount is calculated based on a change from the last mark determination in at least one of the following elements A to E. It is noted that the estimated change amount may be determined based on the average value of the last and before the last time, for example, without being limited to the last time.

A. The number of sheets 3 on which images have been formed

B. The number of times of cover opening and closing

C. Temperature change

D. The number of rotations of the support roller 12B

E. Rotation acceleration of the support roller 12B.

For each element, the deviation amount especially in the main scanning direction tends to increase as a change from the last mark determination becomes large. In this illustrative embodiment, correspondence relationship (for example, proportional relationship) between the deviation amount and the change amount in each element is set experimentally in advance and the correspondence relationship information (a correspondence relationship table or a proportional expression) is stored in the NVRAM 43, for example. For each element, the CPU 40 extracts the deviation amount corresponding to the change amount from the last mark determination based on the correspondence relationship information and sets the total value of the extracted deviation amounts as the estimated change amount.

The CPU 40 increases or decreases the length of the mark M, that is, the width (an example of the width in a direction perpendicular to the moving direction of an object) of a stripe-shaped mark in a long-side direction thereof according to the estimated change amount. Specifically, when the estimated change amount is larger than a first reference amount (S203: YES), the CPU 40 determines that the mark determination precision becomes lower compared with the target level (an example of a case where a set condition is satisfied), sets the length of the mark M to the maximum length (S205), and stores the set length in the NVRAM 43.

Moreover, when the estimated change amount is equal to or smaller than the first reference amount and is larger than a second reference amount which is smaller than the first reference amount (S203: NO and S207: YES), the CPU 40 determines that the mark determination precision is lower compared with the target level (an example of a case where a set condition is satisfied), sets the length of the mark M to the middle length which is shorter than the maximum length (S209), and stores the set length in the NVRAM 43. On the other hand, when the estimated change amount is equal to or smaller than the second reference amount (S207: NO), the CPU 40 sets the length of the mark M to the minimum length which is shorter than the middle length (S211) and stores the set length in the NVRAM 43.

By increasing or decreasing the length of the mark M appropriately according to the estimated change amount as described above, it is possible to suppress that each mark M is formed at the position deviated from the detection region E, which deteriorates the mark determination precision. Moreover, since it is prevented that the length of the mark M unnecessarily increases, unnecessary consumption of toner can be suppressed. Accordingly, the processing can be efficiently performed.

After the length of the mark M is set, the CPU 40 reads from the NVRAM 43 the PWM value for emission adjustment set at the time of adjustment of the amount of emitting light performed last time and increases or decreases the thickness of the mark M, that is, the width (an example of the width in the moving direction of an object) of the stripe-shaped mark in a short-side direction thereof according to the PWM value for emission adjustment. Specifically, when the PWM value for emission adjustment is larger than a first reference value (S213: YES), the CPU 40 determines that the reflectance of the base of the belt 13 has largely decreased by deterioration of the belt 13 and the like and the mark determination precision is lower than the target level (an example of a case where a set condition is satisfied), sets the thickness of the mark M to the maximum thickness (S215), and stores the set thickness in the NVRAM 43.

When the PWM value for emission adjustment is equal to or smaller than the first reference value and is larger than the second reference value which is smaller than the first reference value (S213: NO and S217: YES), the CPU 40 determines that the reflectance of the base of the belt 13 has largely decreased by deterioration of the belt 13 and the like and the mark determination precision is lower than the target level (an example of a case where a set condition is satisfied), sets the thickness of the mark M to the middle thickness which is smaller than the maximum thickness (S219), and stores the set thickness in the NVRAM 43. On the other hand, when the PWM value for emission adjustment is equal to or smaller than the second reference value (S217: NO), the CPU 40 sets the thickness of the mark M to the minimum length which is smaller than the middle thickness (S221) and stores the set thickness in the NVRAM 43. After the thickness setting, the pattern selection processing ends, and the process proceeds to S105 in FIG. 7.

Figure 9:
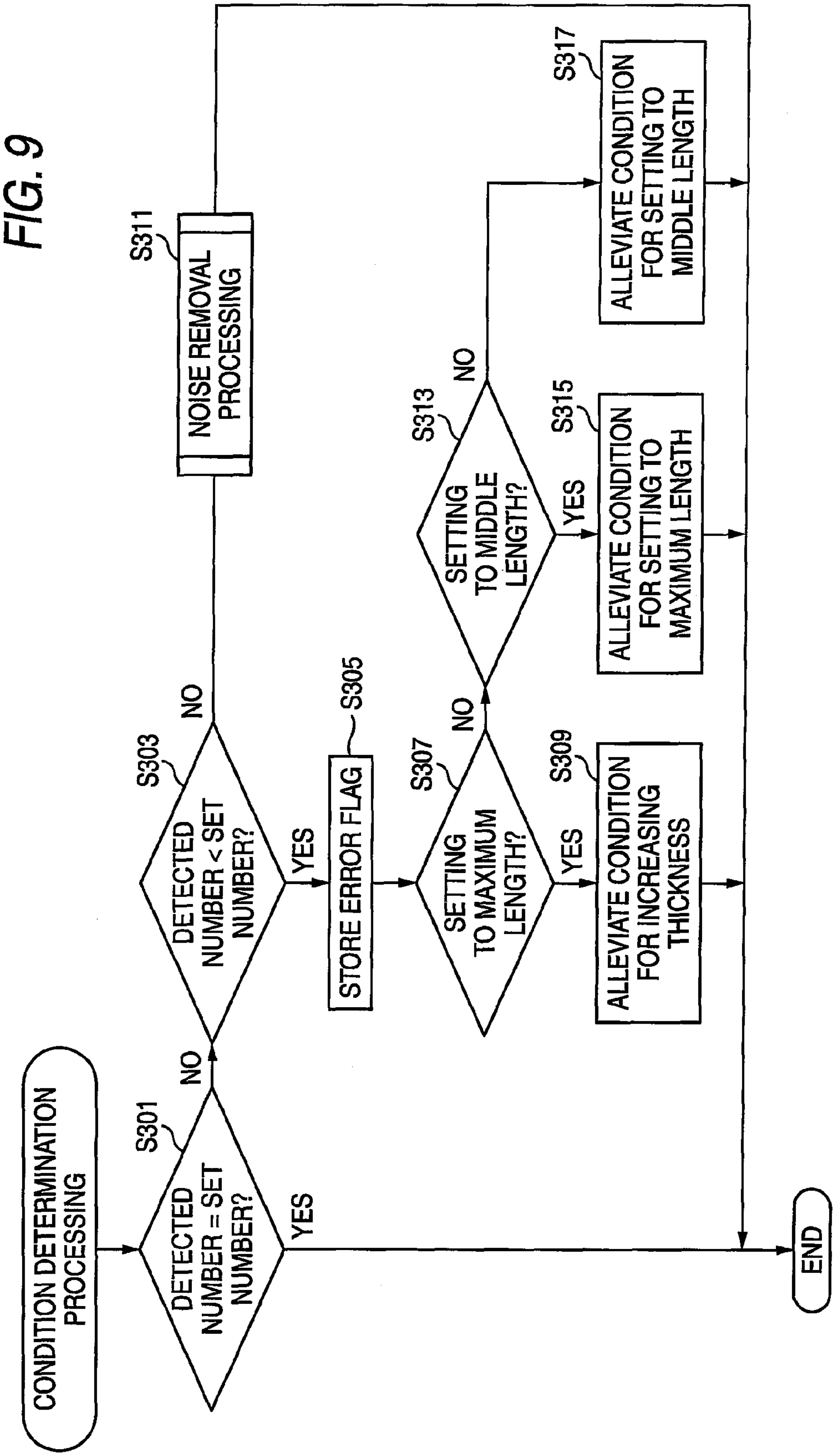
FIG. 9 is a flow chart showing a condition determination processing.

The CPU 40 drives the driving mechanism 47 to rotate the belt 13, controls each formation unit 20 to start forming the correction pattern P, which corresponds to the pattern position correction value, the number of marks M, the set length, and the set thickness, at a position corresponding to the detection region E of each mark sensor 15 on the belt 13 (S105), and starts acquisition of the binary signal S2 from the mark sensor 15 (S107). Then, condition determination processing shown in FIG. 9 is performed (S109).

It is noted that the CPU 40 may store data of the plurality of correction patterns P with different number of marks M, different lengths, and different thicknesses in advance in the NVRAM 43 or the like and select the correction pattern P from the data. Alternatively, the CPU 40 may store only the basic pattern data in advance in the NVRAM 43 or the like and generate a pattern, which is obtained by changing the basic pattern based on the set number of marks M, the set length, and the set thicknesses, as the data of the correction pattern P.

(2-2) Condition Determination Processing

The CPU 40 calculates the number of detected marks M based on the number of pulses of the binary signal S2 and determines whether the detected number is equal to the set number of marks M which configure the correction pattern P (S301). If the detected number is equal to the set number of marks M (S301: YES), this condition determination processing ends without changing each reference amount for the length setting and each reference value for the thickness setting.

On the other hand, when the detected number is smaller than the set number (an example of a case where an adverse effect occurs in the determination result) (S301: NO and S303: YES), it is determined that a mark determination error has occurred and an error flag is stored in the NVRAM 43, for example (S305). Then, when the current set length is set to the maximum length (S307: YES), each reference amount for thickness setting is decreased (S309). For example, each reference amount is multiplied by 0.8. Accordingly, since the condition for increasing the thickness of the mark M is alleviated, it becomes likely to increase the thickness of the mark M in subsequent pattern selection processing. Accordingly, the recurrence of the mark determination error can be suppressed.

When the current set length is set to the middle length (S307: NO and S313: YES), the first reference amount for length setting is decreased (S315). For example, the first reference amount is multiplied by 0.8. Accordingly, since the condition for increasing the length of the mark M to the maximum length is alleviated, it becomes likely to increase the length of the mark M in subsequent pattern selection processing. Accordingly, the recurrence of the mark determination error can be suppressed. When the current set length is set to the minimum length (S313: NO), the second reference amount for length setting is decreased (S317). For example, the second reference amount is multiplied by 0.8. In this case also, the recurrence of the mark determination error can be suppressed.

(2-3) Noise Removal Processing

Figure 10:
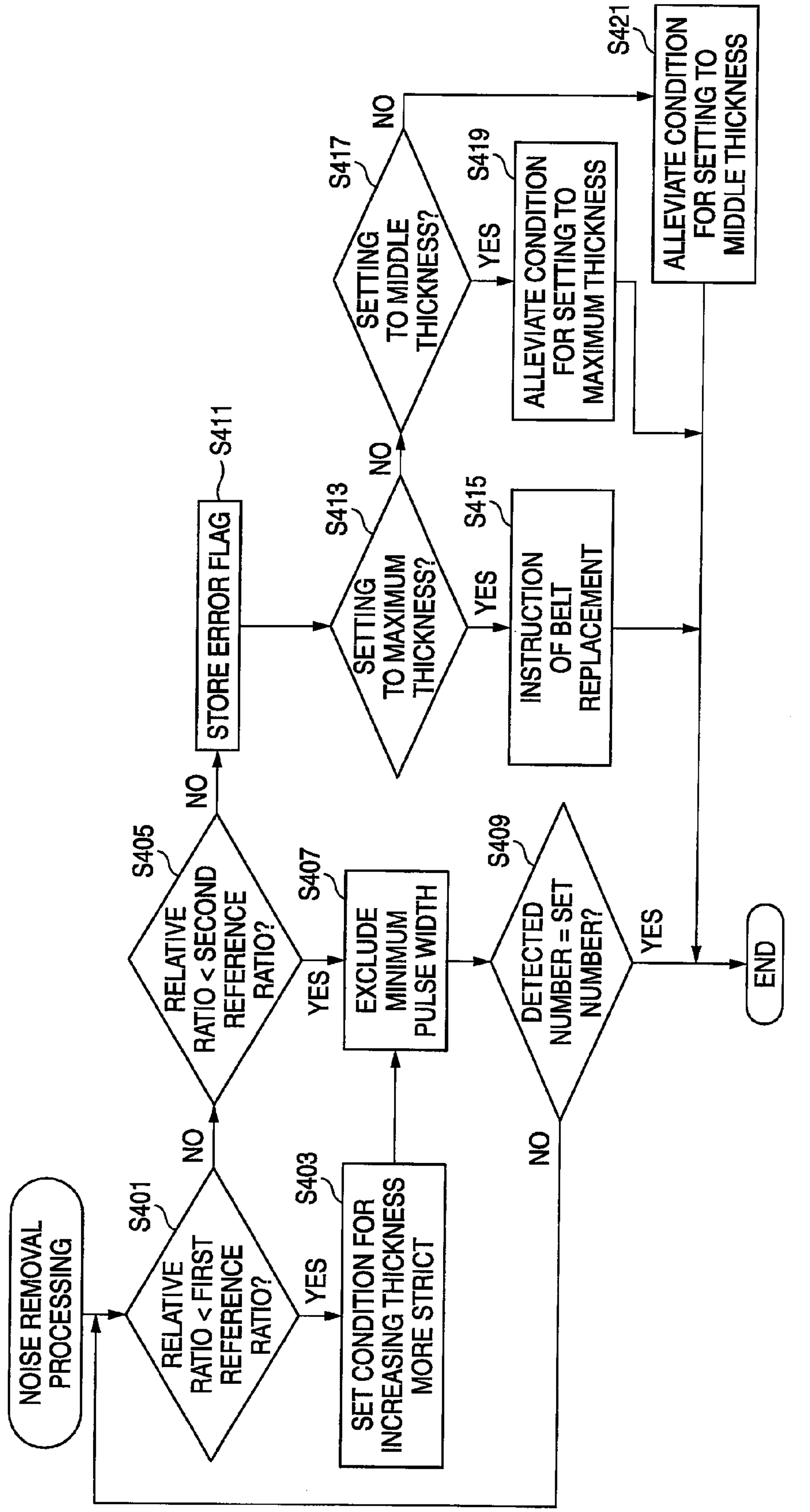
FIG. 10 is a flow chart showing a noise removal processing.

On the other hand, when the detected number is larger than the set number (S303: NO), a noise removal processing shown in FIG. 10 is performed since it is likely that noise is included in the binary signal S2. The CPU 40 determines whether the relative ratio of a minimum pulse width (time interval between a falling edge and a rising edge of the binary signal S2) among the detected pulses to the pulse width which is as large as the set number of pulse width among the detected number of pulses is smaller than a first reference ratio (for example, 0.40) (S401).

Then, when the relative ratio is smaller than the first reference ratio (S401: YES), the CPU 40 determines that the pulse width corresponding to the mark M and the pulse width corresponding to noise can be sufficiently distinguished. Accordingly, the CPU 40 increases each reference value for thickness setting (S403). For example, each reference value is multiplied by 1.05. Accordingly, since the condition for increasing the thickness of the mark M is alleviated, it becomes unlikely to increase the thickness of the mark M in subsequent pattern selection processing. Accordingly, unnecessary consumption of toner can be suppressed. Then, the process proceeds to S407.

When the relative ratio is equal to or larger than the first reference ratio and is smaller than a second reference ratio (for example, 0.85) which is larger than the first reference ratio (S401: NO and S405: YES), the CPU 40 determines that the pulse width corresponding to the mark M and the pulse width corresponding to noise is still distinguishable. Accordingly, the CPU 40 excludes the minimum pulse width, as a pulse width corresponding to noise, from an object of mark determination (S407). Then, if the detected number and the set number become equal (S409: YES), the noise removal processing is ended. If the detected number and the set number are not equal (S409: NO), the process returns to S401.

When the relative ratio is equal to or smaller than the second reference ratio (an example of a case where an adverse effect occurs in the determination result) (S405: NO), the CPU 40 determines that it is not distinguishable the pulse width corresponding to the mark M from the pulse width corresponding to noise and a mark determination error has occurred. Accordingly, the CPU 40 stores an error flag in the NVRAM 43, for example (S411). Then, when the current set thickness is set to the maximum thickness (S413: YES), the CPU 40 determines that the belt 13 has deteriorated so that the mark determination cannot be precisely performed. Accordingly, the CPU 40 displays an instruction of replacement of the belt 13 on the display section 45, for example, so that the user is notified (S415), and the noise removal processing is ended.

When the current set thickness is set to the middle thickness (S413: NO and S417: YES), the first reference value for thickness setting is decreased (S419). For example, each reference value is multiplied by 0.8. Accordingly, since the condition for increasing the thickness of the mark M is alleviated, it becomes likely to increase the thickness of the mark M in subsequent pattern selection processing. Accordingly, the recurrence of the mark determination error can be suppressed. When the current set thickness is set to the minimum thickness (S417: NO), the second reference value for thickness setting is decreased (S421). For example, each reference value is multiplied by 0.8. In this case also, the recurrence of the mark determination error can be suppressed. When the noise removal processing ends, the condition determination processing also ends. Then, the process proceeds to S111 in FIG. 7.

Here, based on whether an error flag is stored in the NVRAM 43, it is determined whether a mark determination error has occurred (S111). When it is determined that a mark determination error has occurred (S111: YES), this correction processing is ended without performing deviation correction. Alternatively, the process may return to S103 when it is determined that a mark determination error has occurred.

Then, the CPU 40 detects the mark width D1K, D1Y, D1M, and D1C of each mark M and the inter-mark distance D2Y, D2M, and D2C based on the pulse width of the binary signal S2 (refer to FIG. 5). Then, the deviation amount in the main scanning direction and the sub-scanning direction is measured based on the detection result (S113).

Specifically, the CPU 40 calculates the average value of the mark width D1 for each mark M and sets the amount, which corresponds to the relative value of the mark width D1 between the reference color mark MK and each of the adjustment color marks MY, MM, and MC, as the deviation amount of an adjustment color image with respect to a reference color image in the main scanning direction. Then, in order to offset this deviation amount, the CPU 40 calculates the deviation correction value for changing the start timing of emission of exposure sections 17Y, 17M, and 17C for adjustment colors (for example, an LED for exposing the end point of a head line of an adjustment color image) and stores the deviation correction value in the NVRAM 43 (S115). The position of the reference color mark MK in the main scanning direction is also stored in the NVRAM 43.

Further, the CPU 40 detects the inter-mark distances D2Y, D2M, and D2C for each mark group of the correction pattern P and calculates the average value of the inter-mark distance D2 in all mark groups for each of the yellow mark MY, the magenta mark MM, and the cyan mark MC. A deviation between the average value of each color mark and the defined value (inter-mark distance when the deviation amount of the adjustment color image with respect to the reference color image in the sub-scanning direction is about zero) is assumed to be the deviation amount of the adjustment color image with respect to the reference color image in the sub-scanning direction.

Then, in order to offset the deviation amount, the CPU 40 calculates the deviation correction value for changing the start timing of emission of the exposure sections 17Y, 17M, and 17C for adjustment colors (for example, start timing of emission of an LED head 18 for exposing the head line of an adjustment color image) and stores the deviation correction value in the NVRAM 43 (S115), and ends the correction processing.

EFFECTS OF THE ILLUSTRATIVE EMBODIMENT

According to the above-described illustrative embodiment, before the mark determination, it is predictively determined whether the mark determination precision will be deteriorated from the target level. Moreover, when it is determined that the mark determination precision is deteriorated at the time of mark determination, the correction pattern P, in which the length or thickness of the mark M or the set number of marks M is increased compared with the case where it is determined that the mark determination precision is not deteriorated, is formed on the belt 13. Therefore, the position of the mark M can be efficiently determined according to the mark determination precision with respect to the target level.

Since a non-related element which does not contribute to suppression of a deterioration in the mark determination precision is not changed, the efficiency of mark determination can be further improved.

OTHER ILLUSTRATIVE EMBODIMENTS

While the present invention has been shown and described with reference to certain illustrative embodiments thereof, it will be understood by those skilled in the art that various changes in form and details may be made therein without departing from the spirit and scope of the invention as defined by the appended claims.

(1) In the above-described illustrative embodiment, the direct transfer type color printer which forms a color image is described as an example, however, the present invention is not limited thereto. The present invention may be applied to an intermediate transfer type printer. In this case, an intermediate transfer body is an example of the moving body. Further, the present invention may be applied to an image forming apparatus which uses other electrophotographic methods, such as a polygon scanning method or an ink jet method.

(2) In the above-described illustrative embodiment, the correction pattern P for correcting the deviation amount of the image forming position is formed on the belt 13, and the positions of the marks M are determined, however, the present invention is not limited thereto. For example, a pattern for density measurement may be formed on the belt 13 to determine the density of a mark. In addition, a pattern may be formed on the sheet 3. In this case, the sheet 3 is an example of an object.

(3) In the above-described illustrative embodiment, the mark M including a pair of stripe-shaped marks formed line-symmetrically is described as an example, however, the present invention is not limited thereto. The pair of stripe-shaped marks may not be provided line-symmetrically. In addition, a mark configured by a single stripe-shaped mark may also be used.

(4) In the above-described illustrative embodiment, mark elements, such as the thickness of the mark M and the like, are increased or decreased according to the PWM value for emission adjustment (state of the base of the belt 13), the estimated change amount, and the target level difference, the present invention is not limited thereto. For example, when it is determined that the relative deviation angle between the sub-scanning direction and the moving direction of the belt 13 is larger than a reference angle, the mark elements may be increased compared with a case where it is determined that the relative deviation angle is not larger than the reference angle. That is, any related element which affects a mark determination result may be used for the basis of changing the mark elements. In addition, the deviation angle may be measured based on the deviation amount in the main scanning direction.

Further, in the above-described illustrative embodiment, the number of marks M is increased or decreased according to the difference in the target level in mark determination, the length of the mark M is increased or decreased according to the estimated change amount, and the thickness of the mark M is increased or decreased according to the state of the base of the belt 13, however, the present invention is not limited thereto. For example, the length or thickness of the mark M may be increased or decreased according to the difference in the target level in mark determination or the deviation angle, or the number of marks M may be increased or decreased according to the estimated change amount, the state of the base of the belt 13, or the deviation angle.

(5) In the above-described illustrative embodiment, the mark determination precision is improved by increasing the length or thickness of the mark M or the set number of marks M, however, the present invention is not limited thereto. For example, the mark determination precision may be improved by increasing the mark width D1, the distance D2 between marks, and the density of the mark M. For example, if the mark width D1 or the distance D2 between marks is small, there is a possibility that the mark determination precision will be deteriorated because waveforms of the light receiving signal S1 corresponding to each stripe-shaped mark shown in FIG. 5 influence each other. Therefore, since the distance between waveforms becomes large by increasing the mark width D1 or the inter-mark distance D2, the mark determination precision can be improved. On the contrary, by reducing the mark width D1 or the distance D2 between marks unless the mark determination precision becomes worse, it is possible to shorten the total length of the correction pattern P. In this case, a time required for the mark determination can be shortened.

Further, by increasing the density of the mark M, the peak of the waveform of the light receiving signal S1 corresponding to each stripe-shaped mark shown in FIG. 5 can be raised, so that the mark determination precision can be improved. On the contrary, by decreasing the density of the mark M unless the mark determination precision becomes worse, the amount of toner used can be suppressed.

(6) In the above-described illustrative embodiment, the processing in FIGS. 7 to 10 may be separately (independently) performed for each correction pattern P or a mark of each color. In this case, if deterioration states of the left and right sides of the belt 13 are different or if the reflection state changes with the mark M of each color, the mark elements can be increased or decreased separately.

(7) In the above-described illustrative embodiment, the set condition is alleviated when the detected number is smaller than the set number (S303 in FIG. 9) or when the relative ratio is equal to or larger than the second reference ratio (S405 in FIG. 10), however, the present invention is not limited thereto. That is, the set condition may be alleviated when an adverse effect occurs in the determination result. For example, the set condition may be alleviated when the pulse width of the binary signal S2 is smaller than a reference width.

(8) In the above-described illustrative embodiment, if the position of the detection region E of a pair of mark sensors 15 and the formation position of the two correction patterns P are set on the left and right end sides of the belt 13 as much as possible, the position variation in the left and right direction is suppressed and accordingly, deviation correction in the main scanning direction and the sub-scanning direction can be performed more precisely. However, it is concerned that the position of the detection region E and the formation position of the correction pattern P are set at the outside of the image formation range for the sheet 3. Therefore, it is advantageous to set an image magnification differently in performing a mark determination and in an image forming on the sheet 3. For example, data of the correction pattern P generated at a magnification in an image forming on the sheet 3 is enlarged to have a magnification for the mark determination by a predetermined ratio, and the mark determination is performed by the correction pattern P after the enlargement. Then, the deviation correction value in the main scanning direction and the sub-scanning direction specified by the determination result is reduced to a magnification for image forming on the sheet 3 by the inverse of the ratio, and the image forming position is corrected based on the deviation correction value after the reduction, and an image is formed on the sheet 3 based on the correction. In this configuration of performing such magnification conversion, the data with different magnification for mark determination and for an image forming on the sheet 3 does not need to be stored in the NVRAM 43 or the like.

The present invention provides illustrative, non-limiting embodiments as follows:

[1] An image forming apparatus comprises: a formation section configured to form an image on an object which moves relatively thereto in a moving direction; a detection section configured to output a detection signal corresponding to a mark formed on the object by the formation section; a first determination section configured to determine at least one of a position of the mark and a density of the mark based on the detection signal; a correction section configured to correct at least one of an image forming position and an image formation density of the formation section based on a determination result by the first determination section; a second determination section configured to determine, before the determination by the first determination section, whether a related element which affects the determination result by the first determination section satisfies a set condition which causes an adverse effect on the determination by the first determination section; and a control section configured to control the formation section to form a pattern including a mark based on a mark element which is increased when the second determination section determine that the related element satisfies the set condition, compared with that when the second determination section determines that the related element does not satisfy the set condition, the mark element of the mark including at least one of: a width thereof in the moving direction of the object; a width thereof in a direction perpendicular to the moving direction; a density thereof; a distance with an adjacent mark in the pattern; and a number of marks in the pattern.

According to this configuration, before the determination for determining at least one of the position and the density of a mark, it is predictively determined whether the determination result of the mark determining section is adversely affected. Then, when it is determined that the determination precision is deteriorated at the time of determination by the first determination section, a mark is formed based on a mark element (including at least one of the width in the movement direction of the object, the width in a direction perpendicular to the movement direction, the density, the distance between marks, and the number of marks) is increased compared with the case when it is determined that the determination section is not adversely affected. Therefore, the position or the density of a mark can be efficiently determined according to an influence given to the determination result.

[2] In the above image forming apparatus, the related element may include at least one of: a state of a base of the object; an estimated amount of change in a next determination result by the first determination section from a last determination result by the first determination section; a difference between a determination precision required for the next determination by the first determination and that for the last determination by the first determination; and a relative deviation angle between the formation section and the moving direction of the object.

As a related element, it may be advantageous to include at least one of: a state of a base of the object, an estimated amount of change in a next determination result by the first determination section from a last determination result by the first determination section; a difference between a determination precision required for the next determination by the first determination and that for the last determination by the first determination; and a relative deviation angle between the formation section and the moving direction of the object.

[3] In the above image forming apparatus, the control section may alleviate the set condition when an adverse effect occurs in the determination actually performed by the first determination. Further, the control section may alleviate the set condition such that the related element is more likely to satisfy the set condition when the adverse effect occurs in the determination actually performed by the first determination.

This configuration, since it is likely to increase the mark element in the next time and after, a deterioration in precision can be suppressed.

[4] In the above image forming apparatus, the first determination section may determine at least the position of the mark, and the control section may control the formation section such that a positional deviation between the mark to be formed by the formation section and a detection position of the detection section is reduced, based on the determination result by the first determination section in a last time and before.

According to this configuration, since the relative positional deviation between the position of the mark formed on the object and the detection position of the detection section is reduced, a deterioration in precision of the determination result can be suppressed more reliably.

[5] In the above image forming apparatus, the formation section may form marks at a plurality of different positions in a direction perpendicular to the moving direction, and the control section may independently change the mark element of the mark formed at each of the positions based on the determination result by the second determination section for the corresponding position.

According to this configuration, a deterioration in precision of the determination result can be suppressed more reliably.

[6] In the above image forming apparatus, the formation section may include a plurality of formation units which form images with different colors, and the control section may independently change the mark element of the mark formed by each of the formation units, based on the determination result by the second determination section for the corresponding formation unit.

According to this configuration, a deterioration in precision of the determination result can be suppressed more reliably.

[7] In the above image forming apparatus, the mark element of the mark may include at least two of the width thereof in the moving direction; the width thereof in the direction perpendicular to the moving direction; the density of thereof; the distance with the adjacent mark in the pattern; and the number of marks in the pattern, and the control section may increase a mark element which causes deterioration in a determination precision by the first determination to be suppressed.

According to this configuration, since a related element which does not contribute to suppression of the deterioration in precision is not increased, the efficiency of mark determination can be further improved.

What is claimed is:

1. An image forming apparatus comprising:

a formation section configured to form an image on an object which moves relatively thereto in a moving direction;

a detection section configured to output a detection signal corresponding to a mark formed on the object by the formation section;

a processor;

a memory having computer readable instructions stored thereon that, when executed by the processor, causes the processor to perform steps of:

first determining at least one of a position of the mark and a density of the mark based on the detection signal;

correcting at least one of an image forming position and an image formation density of the formation section based on a determination result by the first determining step;

second determining, before the determination by the first determining step, whether a related element which affects the determination result by the first determining step satisfies a set condition which causes an adverse effect on the determination by the first determining step; and controlling the formation section to form a pattern including a mark based on a mark element which is increased when the second determining step determines that the related element satisfies the set condition, compared with that when the second determining step determines that the related element does not satisfy the set condition, the mark element of the mark including at least one of:

a width thereof in the moving direction of the object;

a width thereof in a direction perpendicular to the moving direction;

a density thereof; a distance with an adjacent mark in the pattern; and a number of marks in the pattern.

2. The image forming apparatus according to claim 1, wherein the related element includes at least one of:

a state of a base of the object;

an estimated amount of change in a next determination result by the first determining step from a last determination result by the first determining step;

a difference between a determination precision required for the next determination by the first determining step and that for the last determination by the first determining step; and a relative deviation angle between the formation section and the moving direction of the object.

3. The image forming apparatus according to claim 1, wherein the controlling step section alleviates the set condition when an adverse effect occurs in the determination actually performed by the first determining step.

4. The image forming apparatus according to claim 3, wherein the controlling step section alleviates the set condition such that the related element is more likely to satisfy the set condition when the adverse effect occurs in the determination actually performed by the first determining step.

5. The image forming apparatus according to claim 1, wherein the first determining step determines at least the position of the mark, and wherein the controlling step section controls the formation section such that a positional deviation between the mark to be formed by the formation section and a detection position of the detection section is reduced, based on the determination result by the first determining step in a last time and before.

6. The image forming apparatus according to claim 1, wherein the formation section forms marks at a plurality of different positions in a direction perpendicular to the moving direction, and wherein the controlling step independently changes the mark element of the mark formed at each of the positions based on the determination result by the second determining step for the corresponding position.

7. The image forming apparatus according to claim 1, wherein the formation section includes a plurality of formation units which form images with different colors, and wherein the controlling step independently changes the mark element of the mark formed by each of the formation units, based on the determination result by the second determining step for the corresponding formation unit.

8. The image forming apparatus according to claim 1, wherein the mark element of the mark including at least two of the width thereof in the moving direction; the width thereof in the direction perpendicular to the moving direction; the density of thereof; the distance with the adjacent mark in the pattern; and the number of marks in the pattern, and wherein the controlling step increases a mark element which causes deterioration in a determination precision by the first determining step to be suppressed.

9. An image forming apparatus comprising:

a formation section configured to form an image on an object which moves relatively thereto in a moving direction;

a detection section configured to output a detection signal corresponding to a mark formed on the object by the formation section;

a processor;

a memory having computer readable instructions stored thereon that, when executed by the processor, causes the processor to perform steps of:

first determining at least one of a position of the mark and a density of the mark based on the detection signal;

a correcting at least one of an image forming position and an image formation density of the formation section based on a determination result by the first determining step;

second determining, before the determination by the first determining step, whether a determination precision required for a next determination by the first determining step is higher than that for a last determination by the first determining step; and controlling the formation section to form a pattern including a first number of marks which is changed from a second number of marks used for the last determination by the first determining step based on a determination result of the second determining step.

10. The image forming apparatus according to claim 9, wherein when the second determining step determines that the determination precision required for the next determination by the first determining step is higher than that for the last determination by the first determining step, the controlling step controlling the formation section such that the first number becomes larger than the second number.

* * * * *

UNITED STATES PATENT AND TRADEMARK OFFICE

CERTIFICATE OF CORRECTION

PATENT NO. : 8,472,070 B2
APPLICATION NO. : 12/729397
DATED : June 25, 2013
INVENTOR(S) : Kentaro Murayama It is certified that error appears in the above-identified patent and that said Letters Patent is hereby corrected as shown below:

In the Claims:

In Column 17, Claim 4, Line 18:

Please delete “step section alleviates” and insert --step alleviates--

Signed and Sealed this
Twenty-first Day of October, 2014

Michelle K. Lee

*Deputy Director of the United States Patent and Trademark Office*